United States Patent Office 3,300,768
Patented Jan. 24, 1967

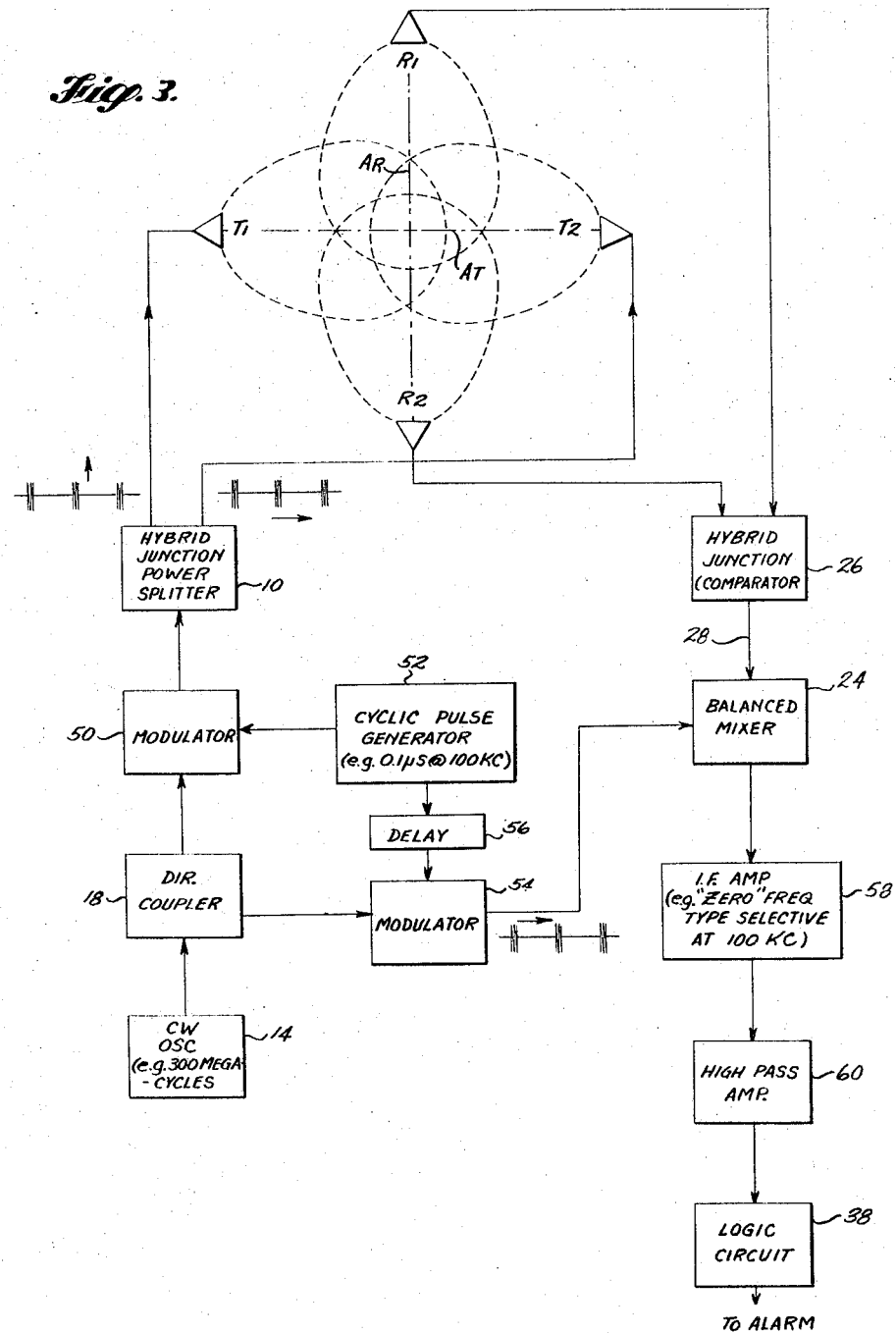

3,300,768
RADIANT ENERGY TYPE INTRUSION
ALARM SYSTEM
Albin Bystrom and Robert V. Hill, Seattle, and Herbert A. Williams, Bellevue, Wash., assignors to The Boeing Company, Seattle, Wash., a corporation of Delaware
Filed Aug. 20, 1963, Ser. No. 303,349
8 Claims. (Cl. 340—258)

This invention relates to systems for detecting the presence of a person within a given surveillance region or area, particularly in an outdoor environment. Also the invention concerns improvements in electromagnetic wave energy detection systems of the described type overcoming the shortcomings and limitations previously experienced, such as loss of detection sensitivity under conditions of fog, rain, snow, smoke, etc., unduly high recurrence of false alarms due to sensitivity to the presence of rain, snow, small animals and birds, etc., large variations in sensitivity due to circuit drift, and sensitivity to counter measures of either the active or passive types. The invention is herein illustratively described by reference to the presently preferred embodiment thereof achieving the foregoing and additional objectives as hereinafter set forth; however it will be recognized that certain modifications and changes therein with respect to details may be made without departing from the essential features involved.

Another important object of this invention is to devise an intrusion detector incorporating improved antenna systems and related circuits by which a definitely prescribed surveillance region may be covered effectively with a substantially uniformly high degree of sensitivity to intrusion or entry into any part of the region, while being relatively insensitive to the presence or movement of objects in outlying positions. A specific object hereof is to devise a system of transmitting and receiving antennae having cooperable field patterns so formed and directed that a person entering their composite field, regardless of the point of entry, will produce a circuit response in the detector of an order of magnitude which is substantially independent of position or change of position of the person.

According to this invention directional transmitting and receiving antennae mounted at respective positions spaced apart along a common base line are each directed at an angle to that base line in triangular relationship therewith. By designing the respective antennae such that the radiation pattern of each defined in polar coordinates is a function of the cosine of twice the polar angle referenced to the base line the system affords effective coverage of a region in the form of a semi-circular segment having its diametral side coincident with said base line, with detection sensitivity being particularly uniform along the semicircle boundary area of the region. Two such pairs of cooperating transmitting and receiving antennae positioned in complemental relationship may thereby cover exclusively a circular zone of substantially uniform sensitivity to the entry of an intruder. In one illustrated embodiment the two pairs of antennae (transmitting and receiving) are both disposed adjacent the same base line, whereas in another illustrated embodiment they are disposed with the transmitting antennae facing directly toward each other along a common directional axis and with the receiving antennae facing toward each other along a common directional axis transverse to the transmitter antennae axis.

A further object is to provide a system which minimizes or eliminates the effects of external sources of radiation and which automatically eliminates the effects of slow drift caused either by changes in circuit conditions internal to the apparatus or by changes in environmental conditions, such as rain, snow, etc. In this regard the invention provides a system of snychronous detection in which the transmitted carrier is pulse modulated at a desired repetition frequency and a portion of the pulse modulated carrier energy is fed directly into the receiving system in order to provide a reference or synchronous gating signal synchronous with received signals representing reradiations from the body of an intruder. That is, only received pulses in phase coincidence with the reference pulses, and of the same carrier frequency, can pass the receiver. Most extraneous or sporadic signals as well as jamming signals are thereby ignored in the receiver circuits.

In the preferred embodiment the synchronous detection is performed in a balanced mixer, which adds to the degree of system selectivity selectively with respect to only desired signals. This mixer comprises a magic T hybrid junction having balanced detectors in the two output legs thereof, which detectors are connected in polarity opposition in an output circuit. Under normal operating conditions, in the absence of an intruder within the surveillance region the detector signals produced only by the reference signal impulses or only by sporadic or extraneous signals balance each other out totally or to a maximum extent in the output circuit, whereas a net signal in the output circuit results when both mixer inputs are synchronously energized, as by the presence of an intruder.

Added selectivity is also achieved by incorporating a high-pass filter in the receiver output stages which rejects the very low frequencies characteristic of drift conditions while permitting passage of transient signals and modulation effects due to the presence and movement of a person in the surveillance area. Characteristically, modulation frequencies below approximately .007 cycle per second are thereby rejected, whereas frequencies above that frequency and to a value as high as 25 cycles per second or less indicative of the presence of an intruder are passed by the filter.

Still an additional degree of selectivity in the system is achieved by the novel arrangement of two pairs of transmitting and receiving antennae, with the transmitters identically energized and the receivers connected to opposing arms of a balanced comparator device, such as a hybrid wave-guide junction, whose net output represents the difference between the respective signals received simultaneously by the two receiving antennae.

Depending on design details in the balanced mixer to which the output of the comparator device and the reference signal from the transmitter circuits are applied, the receiver system can be made sensitive to either or both amplitude or phase variations of the received signals.

These and other features, objects and advantages of the invention will become more fully evident from the following description thereof by reference to the accompanying drawings.

FIGURE 3 is a block diagram of a modified system.

Figure 1:
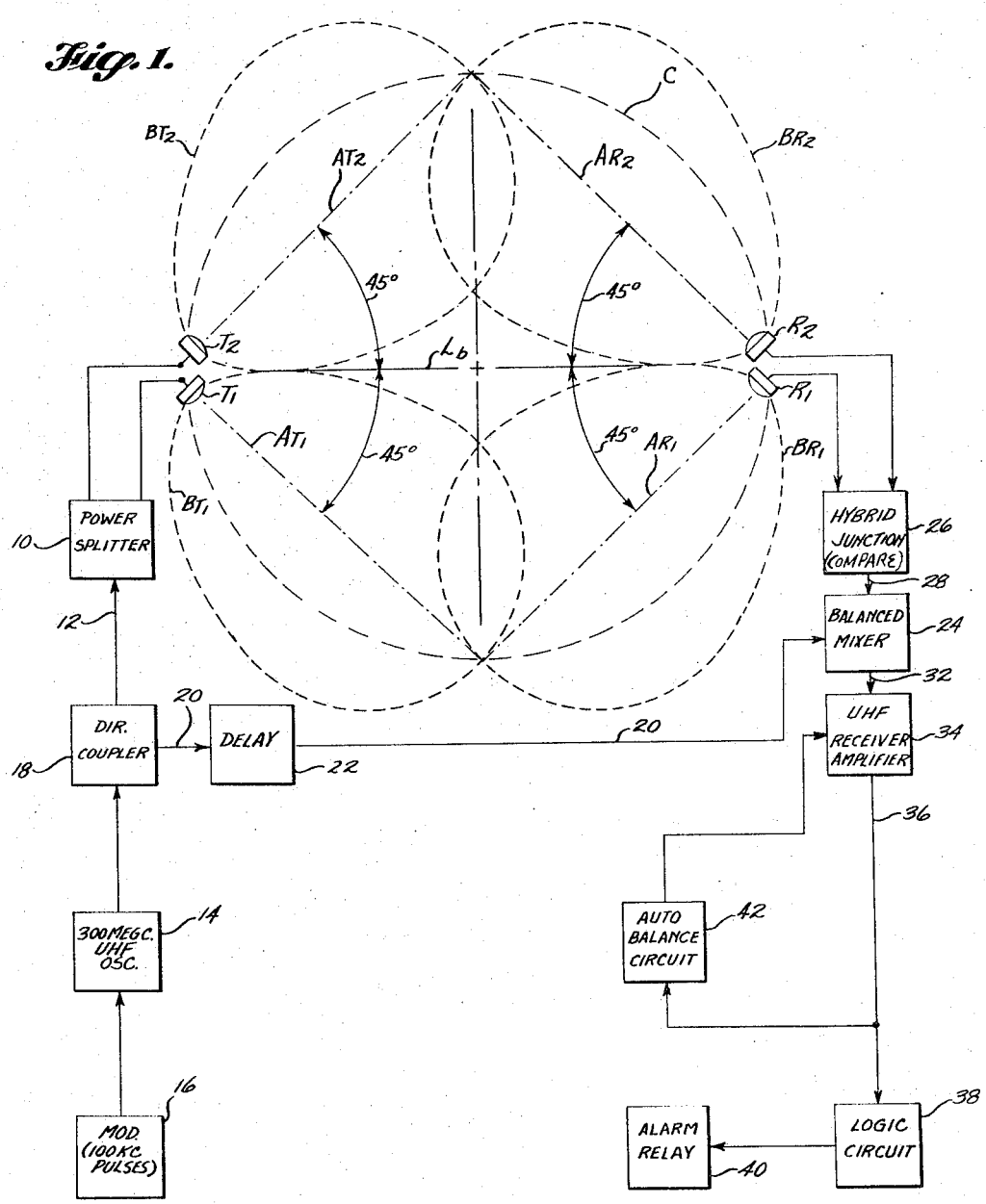
FIGURE 1 is a block diagram of the alarm system in one form.

Referring to FIGURE 1, transmitter antenna T1 cooperates with receiver antenna R1. These are placed along or adjacent to a common base line Lb. In addition to this first pair of antennae, a similarly paired transmitting antenna T2 and receiving antenna R2 are positioned along or adjacent to the same base line. Antennae T1 and R1 have respective axes of directivity AT1 and AR1 angled to each other and to the base line Lb so as to form a triangle therewith on one side of the base line. On the opposite side of the base line the directional axes AT2 and AR2 form a similar triangle with base line L*b*. In the example the included angles between the directional axes of the four antennae and the common base line are 45° each. The respective field patterns of antennae T1, T2, R2 and R1 are respectively designated BT1, BT2, BR2 and BR1.

Figure 2:
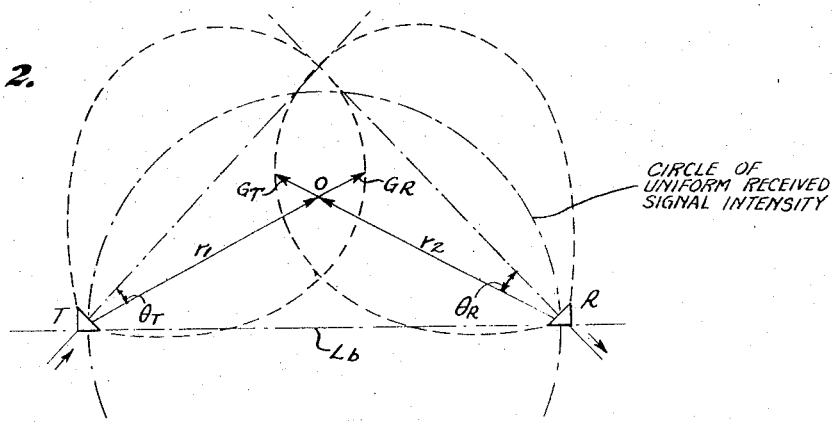
FIGURE 2 is a plan view showing transmitter and receiver antennae positioning and the related surveillance area defined by the antenna field patterns.

In the preferred case, as illustrated in FIGURE 2, wherein it is desired to define by antenna pattern design circular area C through the periphery of which the system is substantially uniformly sensitive to received signals caused by the entry of an intruder, the antenna patterns are defined in polar coordinates as a function of the cosine of twice the polar angle. Thus $G = K \cos 2\theta$, where K is a constant and $\theta$ is the polar angle measured from base line L*b*. The criterion of antenna design is predicated upon the formula relationship depicted in FIGURE 2:

$$R_s \approx \frac{G_R G_T}{r_1^2 r_2^2}$$

wherein $R_s$ is the received signal in antenna R, $r_1$ and $r_2$ are the respective distances from antennae T and R to the intruder at point O, and $G_R$ and $G_T$ are the field pattern vectors of the respective antennae. By developing from this relationship sets of simultaneous equations for each of the two antenna field patterns which satisfy the condition of a constant received signal $R_s$ at all values of $\theta$ and $r$ the described antenna pattern formula set forth above is developed. It will be noted that while the radar equation of equal sensitivity is satisfied everywhere on the boundary of the circle of uniform received signal sensitivity there is some variation in detection sensitivity within the area defined by the circle or semicircle. It is found however that there is a maximum variation of only about 4.6 db from the value of sensitivity encountered at the circle line itself, and for this reason it is considered that the system is "approximately uniform" in its sensitivity. This order of uniformity of sensitivity is experienced generally throughout the area of the circle with the minor exception of a sharply defined localized region along and immediately adjacent to the base line L*b* at which sensitivity drops off to a low value. Here again however the area is so localized in such a small part of the total circular (or semicircular) region that it is of relatively inconsequential effect since in practically every installation in which such a system is desirable the antennae may be arranged physically on the site such that the base line itself is not a critical detection region. It should also be noted that the equations are derived on the basis of free-space conditions. In practice the presence of the ground tends to modify the true free-space condition to some extent. Nevertheless the modification is negligible if one considers the effect of reflecting objects at man height moving over the ground and regards the ground as a dielectric. If the intrduder is crawling on the ground of course the specific ground effect further modifies relationships.

Referring again to FIGURE 1, the two transmitting antennae T1 and T2 are energized equally by the output of a power splitter 10 having a single input 12 subjected to pulse modulated carrier-frequency energy from a source 14. Typically the source comprises a UHF oscillator operating at a frequency of the order of 300 megacycles per second and modulated by pulses of approximately 0.1 microsecond duration, recurring at 100 kilocycles per second. The modulator 16 may comprise any suitable pulse generator whereas the oscillator 14 may comprise any suitable high-frequency oscillator capable of pulsed CW operation at the desired frequency. The output of the oscillator passes through a directional coupler 18 before reaching the power splitter 10, and in the directional coupler a small fraction of the energy is drawn off into a secondary output 20 incorporating a delay network 22 through which this fraction of energy passes for application to a balanced mixer 24 in the receiver system.

Figure 4:
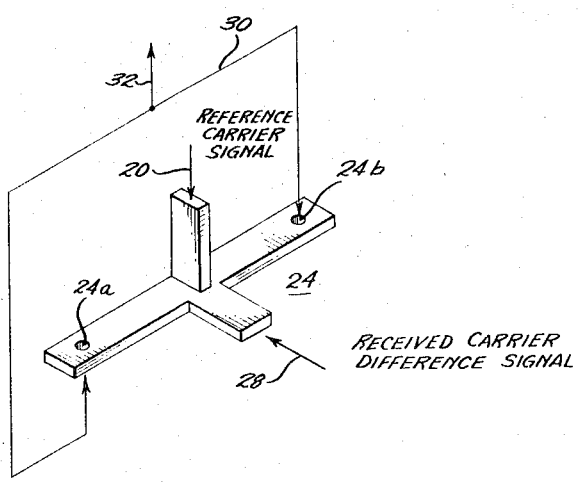
FIGURE 4 is a simplified diagram of a balanced mixer using a magic tee waveguide junction. (Sheet 2 of drawings.)

In the receiver side of the system the outputs of the respective receiving antennae R1 and R2 pass into the two arms of a hybrid junction 26, such as a magic T, which serves as a comparator in which the signals are combined in mutual phase opposition. The output 28 from this comparator carries the difference between the two input signals to the hybrid junction and in the absence of an intruder within the region C is a minimum. The output signal increases to a detachable level in response to reradiations from a person within the region C, and is applied to one of the inputs of the balanced mixer 24 for achieving synchronous detection in the receiver. As depicted in one form in FIGURE 4 the balanced mixer junction has two side arms incorporating the respective detector elements 24a and 24b, preferably of the solid-state rectifier type. These are connected together in phase opposition in an output circuit 30. The net detected signal produced in the output lead 32, representing the recovered envelope of modulation pulses, is applied to the I.F. receiver amplifier 34 preferably tuned to the modulation frequency (e.g. 100 kilocycles per second). This net output signal is a minimum or zero when the hybrid junction output signal in conductor 28 is a minimum, under conditions of no intruder present in the surveillance area C. When a person enters area C a signal passes to receiver amplifier 34, and through its output 36 is applied to the input of a logic circuit 38. The latter is connected to operate an alarm relay 40 or other device whenever the product of the duration and magnitude of the receiver output signal exceeds a predetermined level. Signals of lesser magnitude-duration product are rejected by the logic circuit, thereby eliminating false alarms from transient conditions not indicative of an intrusion by a person in the area C.

In the example, the output of receiver amplifier 34 is applied to an automatic balancing circuit 42 applying negative feedback to one or more stages of the amplifier. Automatic balancing circuit 42 comprises a low-pass filter which passes only those frequencies below a selected minimum and which thus degenerates and suppresses drift in the circuits themselves, or drift caused by the presence of snow or rain, etc. In effect the automatic balance circuit serves in a servo network by which the receiver amplifiers are automaticaly compensated to pass only the frequency components within the detection band of interest.

In FIGURE 3 parts corresponding to those in FIGURE 1 bear similar reference numerals. In this embodiment CW oscillator 14 delivers a continuous carrier wave signal to the directional coupler 18. The principal output of this directional coupler passes through pulse modulator 50 operated by the cyclic pulse generator 52 so as to deliver recurring short pulses of carrier wave energy to the input of the hybrid junction power splitter 10. Some of the energy applied to the directional coupler 18 is drawn off and applied to the modulator 54 which is operated by the cyclic pulse generator 52 through a delay means 56, such that the output pulses applied by modulator 54 to the balance mixer 24 reach the mixer in time coincidence with the differential of received impulses applied thereto through the hybrid junction 26. I.F. amplifier 58 receives the output of balanced mixer 24 and amplifies selectively the first spectral line thereof, namely the 100 kilocycle per second frequency representing the pulse repetition frequency of pulse generator 52. The amplified output of amplifier 58 passes through the high-pass amplifier or filter 60 before application to the logic circuit 38 which controls the alarm or other utilization means associated with system as in the previously described embodiment. As before, the frequency selectivity of amplifier 58 provides selectivity in the system against unwanted signals. This selectivity is added to that afforded by the novel antenna field pattern arrangement, by the pairing of receivers in the respective inputs of a balanced junction comparator, as well as by the step of passing the output of the hybrid junction 26 through a balance mixer 24 operating on the principle of synchronous detection.

The components and circuits shown in the block diagrams are or may be of conventional well known forms. For example a suitable antenna construction producing the described type of radiation pattern is described in IRE Transactions on Antennae and Propagation, vol. AP–2, No. 3, July 1954, p. 113. Block 16 may embody the teachings of "Microwave Journal," vol. 5, No. 6, June 1962, p. 156; blocks 14, 16 and 52 the teachings of "Microwave Journal," vol. 6, No. 2, March 1963, vol. 6, No. 3, April 1963, p. 126; blocks 10, 18, 24 and 26 the teachings of "Microwave Engineer's Handbook and Buyer's Guide," December 1962, by Horizon House-Microwave, Inc. (back cover and inside page); and blocks 50, 54 and 56, the teachings of "Microwave Engineer's Handbook and Buyer's Guide" (supra), p. 57. Delay unit 22 may of course comprise any suitable delay line such as a length of coax line, or a delay network (dynamic or passive) well known for many years in the art. I.F. amplifiers 34 and 58 are or may be conventional amplifiers tuned to the selected frequency. Auto-balance circuit 42 as described on page 7 lines 17 et seq., may comprise any suitable or known negative feedback connection in the amplifier 34 including a low-pass filter therein. High-pass amplifier 60 is or may be as described, an amplifier having a high-pass frequence response characteristic achievable in conventional manner. Logic circuit 38 is described to be a simple integrating circuit which may be of conventional R.C. type known in the art for many years.

These and other aspects of the invention will be recognized by those skilled in the art based on the foregoing description of the illustrated embodiments, which are intended as examples and not to be delimitive upon the scope of the invention as defined by the appended claims.

We claim as our invention:

1. An intrusion detector system comprising directional transmitting and receiving antennae positioned on a common base line in an azimuth plane and each having a principal axis of directivity angled to said line to define a triangle therewith, means applying energy to said transmitting antenna, and detector means responsively connected to the receiving antenna, said antennae having respective field patterns defined in polar coordinates referenced to their directional axes which vary as a function of cos $2\theta$, where $\theta$ is the coordinate angle, within a detection region substantially including said triangle so that the received signal from an intruding subject in the azimuth plane remains substantially constant at different points of entry within such detection region.

2. An intrusion detector system comprising two pairs of directional transmitting and receiving antennae, the transmitting and receiving antennae of each pair being positioned on a common base line and each having a principal axis of directivity angled to said line to define a triangle therewith, means applying energy to the transmitting antenna of each pair, and detector means responsively connected to the receiving antennae of the two pairs, including means responsive selectively to a difference between the received signals in the two receiving antennae, said antennae in each pair having respective field patterns so shaped within a detection region substantially including said triangle that the received signal from an intruding subject in the azimuth plane remains substantially constant at different points of entry within such region, the antennae of one pair being arranged with field patterns in overlapping relationship with field patterns of the other pair.

3. An intrusion detector system comprising two pairs of directional transmitting and receiving antennae, the transmitting and receiving antennae of each pair being positioned on a common base line and each having a principal axis of directivity angled to said line to define a triangle therewith, the triangularly related base line and directional axes of one pair being arranged back-to-back with those of the other pair and their respective base lines being substantially coincident, means applying energy to the transmitting antenna of each pair, and detector means responsively connected to the receiving antennae of the two pairs, including means responsive selectively to a difference between the received signals in the two receiving antennae, said antennae in each pair having respective field patterns so shaped within a detection region substantially including said triangle that the received signal from an intruding subject in the azimuth plane remains substantially constant at different points of entry within such region.

4. The system defined in claim 2, wherein the receiving antennae substantially face each other on a common line of directivity and the transmitting antennae face each other on a common line of directivity transverse to that of the receiving antennae.

5. An intrusion detector system as defined in claim 2, wherein the means applying energy to the transmitting antennae comprise a source of periodically pulse-modulated carrier-wave energy the output of which is divided in a selected ratio between antennae, and wherein the selectively responsive means includes a balanced carrier frequency synchronous detector having a first input including means connecting the input to both receiving antennae to energize said balanced detector in accordance with the difference between received carrier wave signals in said receiving antennae, a second input connected to the transmitter energy applying means to be energized thereby, and a pair of output detector elements connected in mutual phase opposition in a substantially balanced output circuit whereby net signal produced in the output circuit is increased by intrusion of a subject into the detection region.

6. An intrusion detector system comprising two pairs of directional transmitting and receiving antennae, the transmitting and receiving antennae of each pair being positioned on a common base line in an azimuth plane and each having a principal axis of directivity angled to said line to define a triangle therewith, means applying energy to the said transmitting antenna of each pair, and detector means responsively connected to the receiving antennae, said antennae having respective field patterns defined in polar coordinates referenced to their directional axes which vary as a function of cos $2\theta$, where $\theta$ is the coordinate angle, within a detection region substantially including said triangle so that the received signal from an intruding subject in the azimuth plane remains substantially constant at different points of entry within such detection region, the antennae of one pair being arranged with field patterns in overlapping relationship with field patterns of the other pair.

7. An intrusion detector system comprising directional transmitting and receiving antennae positioned on a common base line in an azimuth plane and each having a principal axis of directivity angled to said line to define a triangle therewith, said transmitting antenna being located at one vertex of said triangle and said receiving antenna being located at another vertex of said triangle to define a protected area therebetween, means applying energy to said transmitting antenna, detector means responsively connected to the receiving antenna, and alarm means coupled to said detector means, said antennae having respective field patterns so shaped within a detection region substantially including said triangle that the received signal from an intruding subject in the azimuth plane remains substantially constant at different points within such region, said means applying energy to the transmitting antenna comprising a source of periodically pulse-modulated carrier wave energy, said detector means comprising a mixer having two inputs respectively connected to the receiving antenna and said source and having output detector elements connected with opposing polarity in a balanced output arrangement producing a net output which is increased by a subject entering the detection region of the system, and said alarm means being actuated by the said increased net output from said detector means produced by a subject entering the detection region of the system.

8. The system defined in claim 7, wherein the input connected to the source comprises a direct circuit connection having delay means therein timing the pulses applied thereby to the balanced mixer to occur in substantially cophased relationship with those applied by the receiving antenna.

References Cited by the Examiner

UNITED STATES PATENTS

| | | | |
|---|---|---|---|
| 2,038,878 | 4/1936 | Strutt | 340—258 |
| 2,071,933 | 2/1937 | Miessner | 340—258 |
| 2,197,028 | 4/1940 | Wolff | 343—5 |
| 2,247,246 | 6/1941 | Lindsay | 340—258 |
| 2,435,569 | 2/1948 | Barrow | 343—12 X |
| 2,491,542 | 12/1949 | Woodyard | 340—258 |
| 2,660,718 | 11/1953 | Summerhayes | 340—258 |
| 3,076,191 | 1/1963 | Williams. | |
| 3,189,883 | 6/1965 | Lucas | 340—258 X |
| 3,197,772 | 7/1965 | Robert | 343—7.7 |

FOREIGN PATENTS 954,536    4/1964    Great Britain.

NEIL C. READ, *Primary Examiner.*

R. M. GOLDMAN, *Assistant Examiner.*